United States Patent [19]
Kubo

[11] Patent Number: 5,727,329
[45] Date of Patent: Mar. 17, 1998

[54] DEVICE FOR MEASURING A FIGURE

[75] Inventor: Akio Kubo, Tokyo, Japan

[73] Assignee: Ushikata Mfg. Co., Ltd., Tokyo, Japan

[21] Appl. No.: 671,257

[22] Filed: Jun. 26, 1996

[30] Foreign Application Priority Data

Jul. 3, 1995 [JP] Japan ................... 7-167606

[51] Int. Cl.$^6$ ................. G01B 5/26; G01B 7/32
[52] U.S. Cl. ................. 33/773; 33/1 M; 33/124
[58] Field of Search ................. 33/773, 1 M, 1 CC, 33/124, 123, 18.1, 772, 449, 574, 579, 20.1, 121, 122; 264/559, 560-564

[56] References Cited

U.S. PATENT DOCUMENTS

| | | | |
|---|---|---|---|
| 4,616,419 | 10/1986 | Kubo | 33/122 |
| 4,617,740 | 10/1986 | Mikio | 33/123 |
| 5,115,569 | 5/1992 | Kubo | 33/1 M |
| 5,515,299 | 5/1996 | Kaji et al. | 33/121 |
| 5,551,161 | 9/1996 | Kubo | 33/1 M |

FOREIGN PATENT DOCUMENTS

| | | |
|---|---|---|
| 55-37682 | 9/1980 | Japan. |
| 62-119407 | 5/1987 | Japan. |
| 4208013 | 7/1992 | Japan. |
| 5-31721 | 5/1993 | Japan. |

*Primary Examiner*—Christopher W. Fulton
*Attorney, Agent, or Firm*—Greenblum & Bernstein, P.L.C.

[57] ABSTRACT

A device for measuring a figure. The measuring device includes an auxiliary tracer to obtain measurement coordinates when a measuring lever of the measuring device is beyond a predetermined rotatable range. The auxiliary tracer functions to increase the measurable range of the measuring device without having to increase the over-all length of the measuring device. The device includes a body having a pair of wheels with a measuring lever extending therefrom and having a main tracer. An auxiliary tracer is provided on an auxiliary arm extending from the measuring lever. Data from either the main tracer or the auxiliary tracer can be processed by a processor to measure the figure.

20 Claims, 4 Drawing Sheets

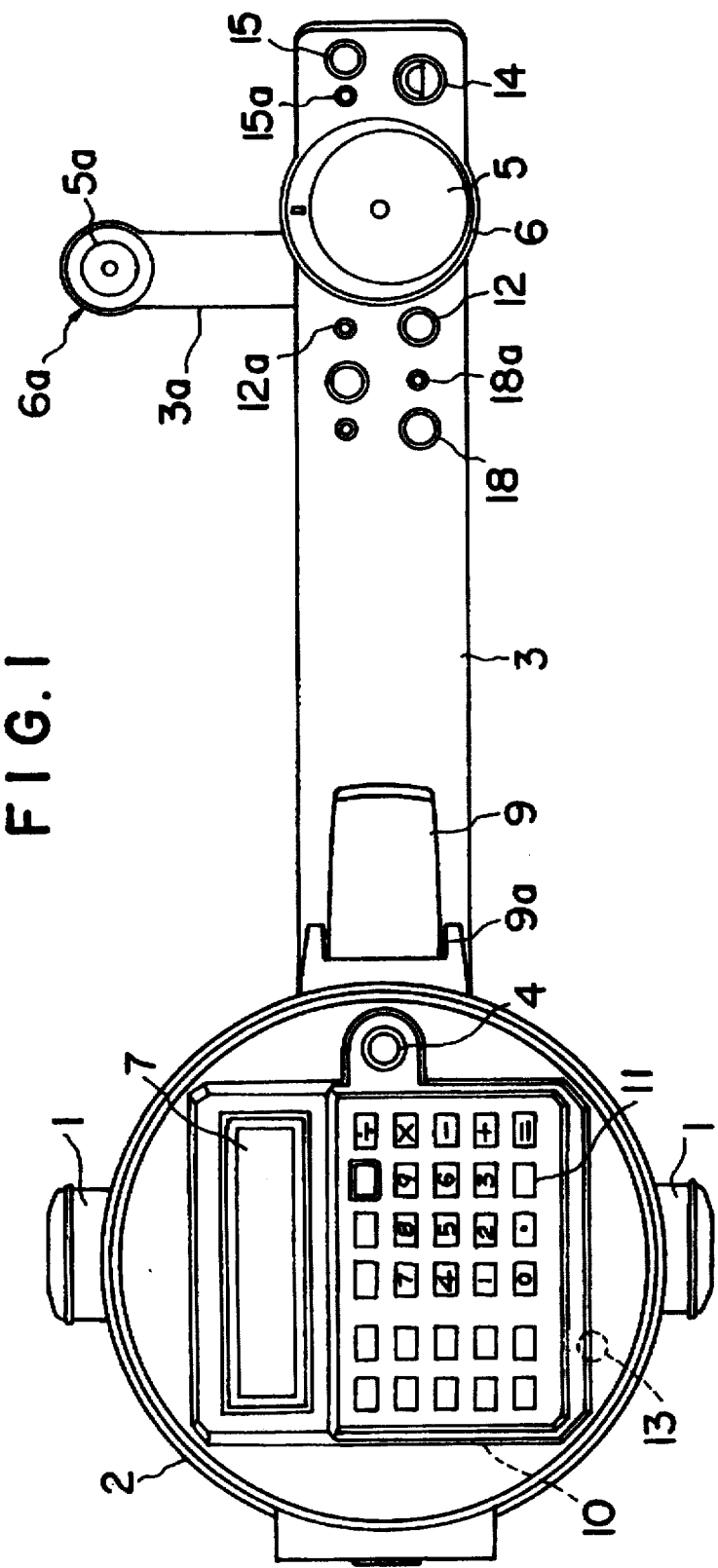
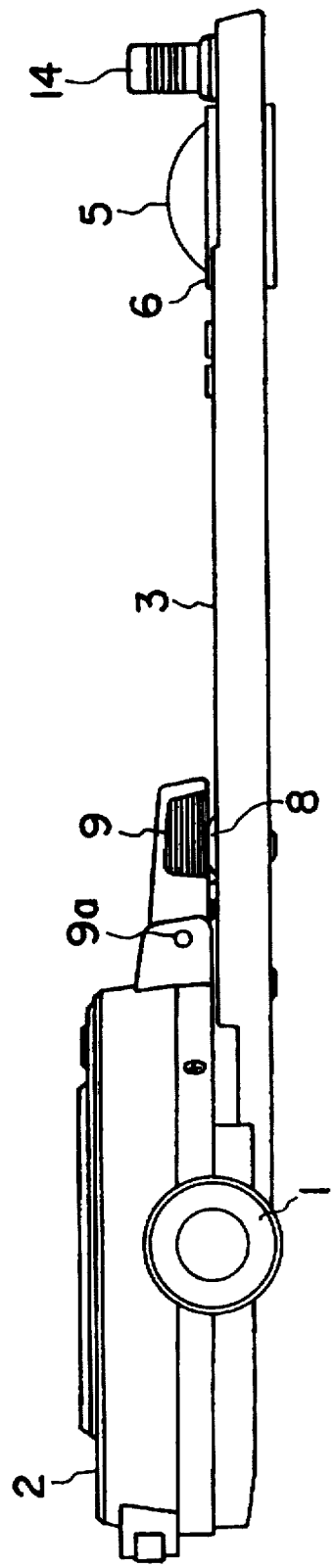

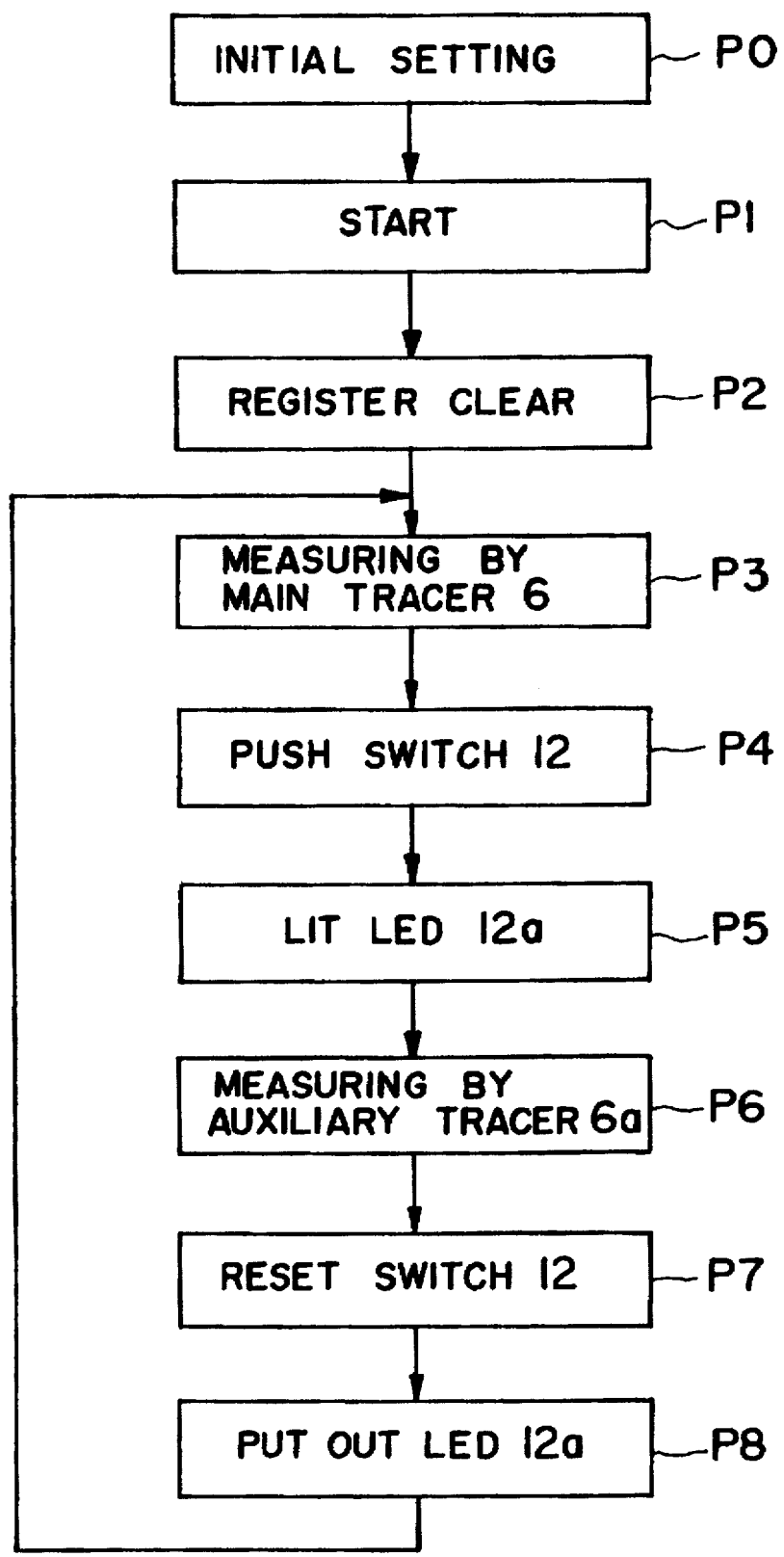

DEVICE FOR MEASURING A FIGURE

BACKGROUND OF THE INVENTION

1. Field of the Invention

The present invention is directed to a device for measuring a figure. More particularly, the present invention is directed to a device for measuring coordinates of a figure, a length of a line making up part of or extending along the figure, and similar dimensions or parameters of the figure for use with a linear planimeter or similar planimeters.

2. Background and Material Information

A planimeter is a device provided at an end of a measuring lever for tracing a figure before entering measured values into a computer to measure an area, length, or coordinates of the figure.

However, it is inconvenient to reset the measurement if the figure is out of a measurable range, since the measurable range, obtained by turning the measuring lever, is approximately 190 mm (equivalent to an angle of approximately 56 degrees) from a center line.

SUMMARY OF THE INVENTION

Accordingly, an object of the present invention is to provide a measuring device for a figure that is not encumbered with the above-discussed resetting inconvenience.

According to a preferred embodiment of the present invention, a device for measuring a figure comprises a pair of wheels associated with a device body to reciprocally move the measuring device. A near end of a measuring lever is attached to the device body via a vertical shaft. A main tracer is located proximate a far end of the measuring lever. An arm lever extends in a lateral plane from the far end of the measuring lever, and includes an auxiliary tracer attached proximate a far end thereof.

An advantage of the present invention includes the provision of a selecting switch that serves to select one of the main tracer and the auxiliary tracer. The measuring device also includes an indicator that indicates which of the main tracer and the auxiliary tracer is selected by the selecting switch.

According to a feature of the present invention, the auxiliary tracer is perpendicularly secured to the measuring lever.

According to another feature of the present invention, the measuring device includes a processing unit that performs calculations in accordance with a predetermined equation using the obtained coordinate points. The processing unit employs a first predetermined equation when the selecting switch selects the main tracer, and employs a second predetermined equation when the selecting means selects the auxiliary tracer.

According to an object of the present invention, a measuring apparatus is disclosed for tracing a figure, comprising a main tracer that traces the figure and produces a signal related to coordinate points of the traced figure, and an auxiliary tracer that traces the figure and produces a signal related to coordinate points of the traced figure. The auxiliary tracer is offset from the main tracer. Drivers are provided for driving the main tracer and the auxiliary tracer to trace the figure. A mechanism is provided for selecting one of said main tracer and said auxiliary tracer. The measuring device also includes a processor that performs calculations in accordance with or executes a predetermined equation using the obtained coordinate points.

According to an advantage of the present invention, an indicator is provided for indicating whether the main tracer or the auxiliary is selected by the selecting mechanism. In the preferred embodiment of the present invention, the indicating means provides a visual indication.

Another advantage of the present invention is that the processor performs calculations in accordance with a first predetermined equation when the main tracer is selected by the selecting mechanism, and executes a second predetermined equation when the auxiliary tracer is selected by the selecting mechanism.

According to a feature of the present invention, the measuring apparatus further includes a device for inputting coordinate points traced by one of the main tracer and the auxiliary tracer.

A feature of the present invention includes the provision of a device for enabling and disabling the processor.

According to an object of the present invention, an apparatus is disclosed for tracing a figure. The apparatus comprises a main body. A main tracer is positioned a first predetermined distance from the main body. The main tracer functions to obtain coordinate points of the figure being traced. An auxiliary tracer is positioned a second predetermined distance from the main body, and also functions to obtain coordinate points of the figure being traced. The auxiliary tracer is offset from the main tracer. A driving mechanism is included that functions to propel the tracing apparatus to trace a desired path. A selector selects which of the main tracer and the auxiliary tracer provides data to a processor at a predetermined time. The processor receives the data at the predetermined time, and performs selected calculations based upon the received data.

According to an advantage of the present invention, the tracing apparatus further includes a device for forwarding or transmitting the data to the processor at said predetermined time.

Another advantage of the present invention that a first arithmetic equation is executed by the processor when the selector selects the main tracer. A second arithmetic equation is executed by the processor when the selector selects the auxiliary tracer.

According to a feature of the present invention, the auxiliary tracer is perpendicularly positioned relative to the main tracer in a lateral plane.

Another feature of the present invention is the inclusion of an indicator that indicates which of the main tracer and the auxiliary tracer is selected by the selector.

The present disclosure relates to subject matter contained in commonly assigned U.S. application Ser. No. 08/651,764 to Katsumi KAJI, filed on May, 22, 1996 and entitled "Measuring Apparatus For Figures", which is expressly incorporated herein by reference in its entirety.

The present disclosure also relates to subject matter contained in Japanese Patent Application No. HEI 7-167606 (filed on Jul. 3, 1995), which is expressly incorporated herein by reference in its entirety.

BRIEF DESCRIPTION OF THE DRAWINGS

The foregoing and other objects, features, and advantages of the present invention will be understood from the following more particular description of a preferred embodiment, as illustrated in the accompanying drawings which are presented as a non-limiting example, in which reference characters refer to the same parts throughout the various views, and wherein:

FIG. 1 is a top view illustrating a preferred embodiment of a device for measuring a figure according to the present invention;

FIG. 2 is a side view illustrating the preferred embodiment of the present invention;

DETAILED DESCRIPTION OF THE PREFERRED EMBODIMENT

Figure 3:
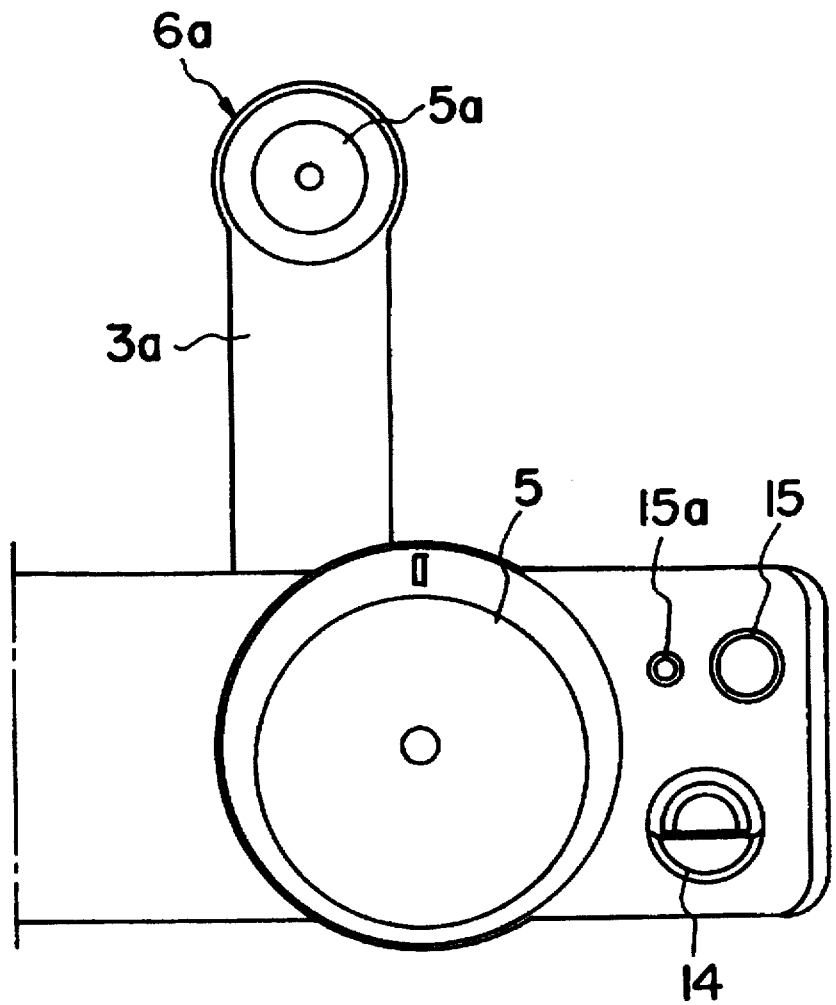
FIG. 3 is an enlarged top view illustrating major parts of the preferred embodiment of the present invention.

FIG. 1 illustrates a top view illustrating a preferred embodiment of a device for measuring a figure of the present invention, as applied to a planimeter. As shown in FIG. 1, the preferred embodiment comprises a pair of thick-width wheels 1, a disk-like device body 2, a measuring lever 3, a vertical shaft 4, an eccentric magnifying lens 5 that assists in the tracing of the figure, a main tracer 6 that includes an auxiliary lens 5a that functions in a manner similar to lens 5 for tracing the figure, and a digital display 7. The shaft 4 extends perpendicularly to the plane of the device body 2. While the preferred embodiment discloses the use of a pair of wheels, it is understood that a single wheel, more than two wheels, or even a different driving mechanism may be employed in place of the pair of wheels to drive (propel) the measuring device without departing from the spirit and/or scope of the present invention.

Device body (main body) 2 is provided to be reciprocally moved in one direction by the pair of wheels 1. A first or near end of the measuring lever 3 is pivotally fitted (connected) to the device body 2 via the vertical shaft 4. The main tracer 6 is attached proximate a second or far end of the measuring lever 3. Further, the magnifying lens 5 is turnably fitted (connected) proximate the far end of the measuring lever 3. The magnifying lens 5 is used for tracing a figure.

The digital display 7 is housed in the device body 2, and functions to indicate measured values. Device body 2 includes a locking mechanism means 9 (FIG. 2) that is secured thereto for rotation about a shaft 9a of the locking mechanism means 9. The locking mechanism means 9 is provided with a pin 8 that is embedded in the measuring lever 3 when the measuring lever 3 is located at a predetermined reference position.

A start switch D (FIG. 5) is provided and can be selectively switched between an OFF state and an ON state in response to movement of pin 8. The start switch D is turned OFF when the measuring device is locked by positioning the measuring lever 3 at the reference position. The start switch D is turned ON by moving the measuring lever 3 from the reference position, which releases the locking means 9. When the start switch D is turned ON, a signal "d" (FIG. 5) is generated that resets a measured value to an initial value of zero.

Figure 4:
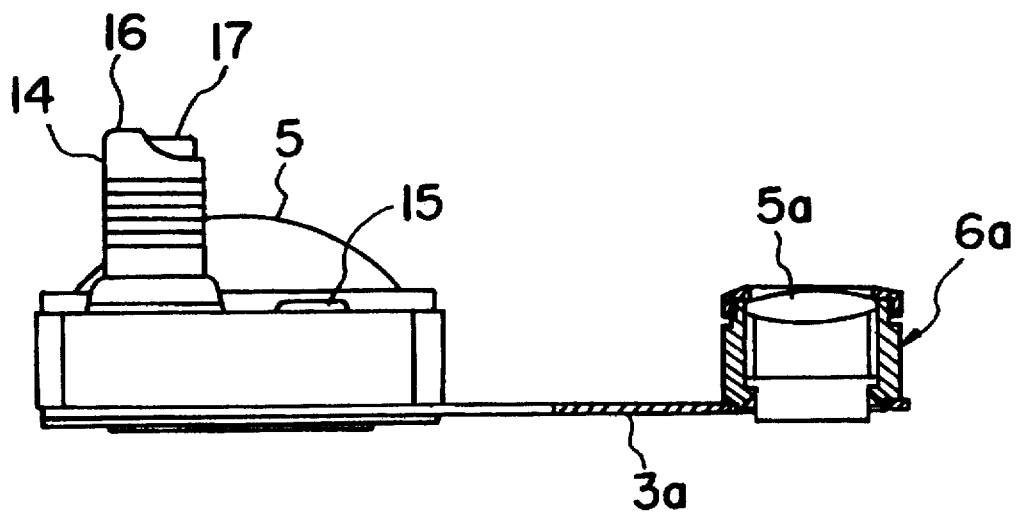
FIG. 4 is a cross-sectional side view illustrating the major parts of the preferred embodiment of the present invention.

A near end of an auxiliary arm 3a is perpendicularly connected to the measuring arm 3 and extends in a lateral plane substantially transverse to the measuring arm 3, proximate the far end of the measuring lever 3, as shown in FIGS. 3 and 4. The auxiliary arm 3a includes an auxiliary lens 5a and an auxiliary tracer 6a that are attached at a far end of the auxiliary arm 3a. Thus, the auxiliary tracer 6a is offset from the main tracer 6 by a predetermined distance. The auxiliary lens 5a is intended to be used with the auxiliary tracer 6a.

The lens 5 and lens 5a are used to enable one to accurately trace the figure that is being measured. Further, lens 5 is eccentrically mounted for purposes of adjustment.

The measuring lever 3 includes a selecting switch (selector) 12. The selector 12 is positioned proximate the far end of the measuring lever 3 and functions to select whether a measurement is to be performed using the main tracer 6 or the auxiliary tracer 6a. Measuring lever 3 further includes an auxiliary mode indicator LED 12a, which is positioned proximate the selecting switch 12, and which functions to indicate which tracer (main tracer 6, or auxiliary tracer 6a) has been selected by the selecting switch 12.

The measuring device includes a computer (processing device) 10. FIG. 1 illustrates that the processing device 10 is housed in the device body 2. However, it is understood that the processing unit can alternatively be housed in the measuring lever, or even be separate from the planimeter, without departing from the spirit and/or scope of the present invention.

The processing device 10 includes a keyboard 11 for entering commands, such as, for example, a diminishing rate, a unit, an arithmetic operation, and/or a measuring mode, into the processing unit 10. A result of an arithmetic operation performed by the processing unit 10 is indicated by a digital display 7 associated with the processing device 10.

The processing unit 10 also includes an adjusting signal setting switch 13 for setting an adjusting signal. The measuring lever 3 further includes a coordinate holding switch 14, a continuous-discontinuous turning switch 15, and an arc signal setting switch 18 that are provided at the far end of the measuring lever 3. An indicator lamp 15a, positioned proximate the continuous-discontinuous turning switch 15, indicates a setting of the continuous-discontinuous turning switch 15. An indicator lamp 18a, positioned proximate the arc signal setting switch 18, indicates a setting of the arc signal setting switch 18.

Figure 5:
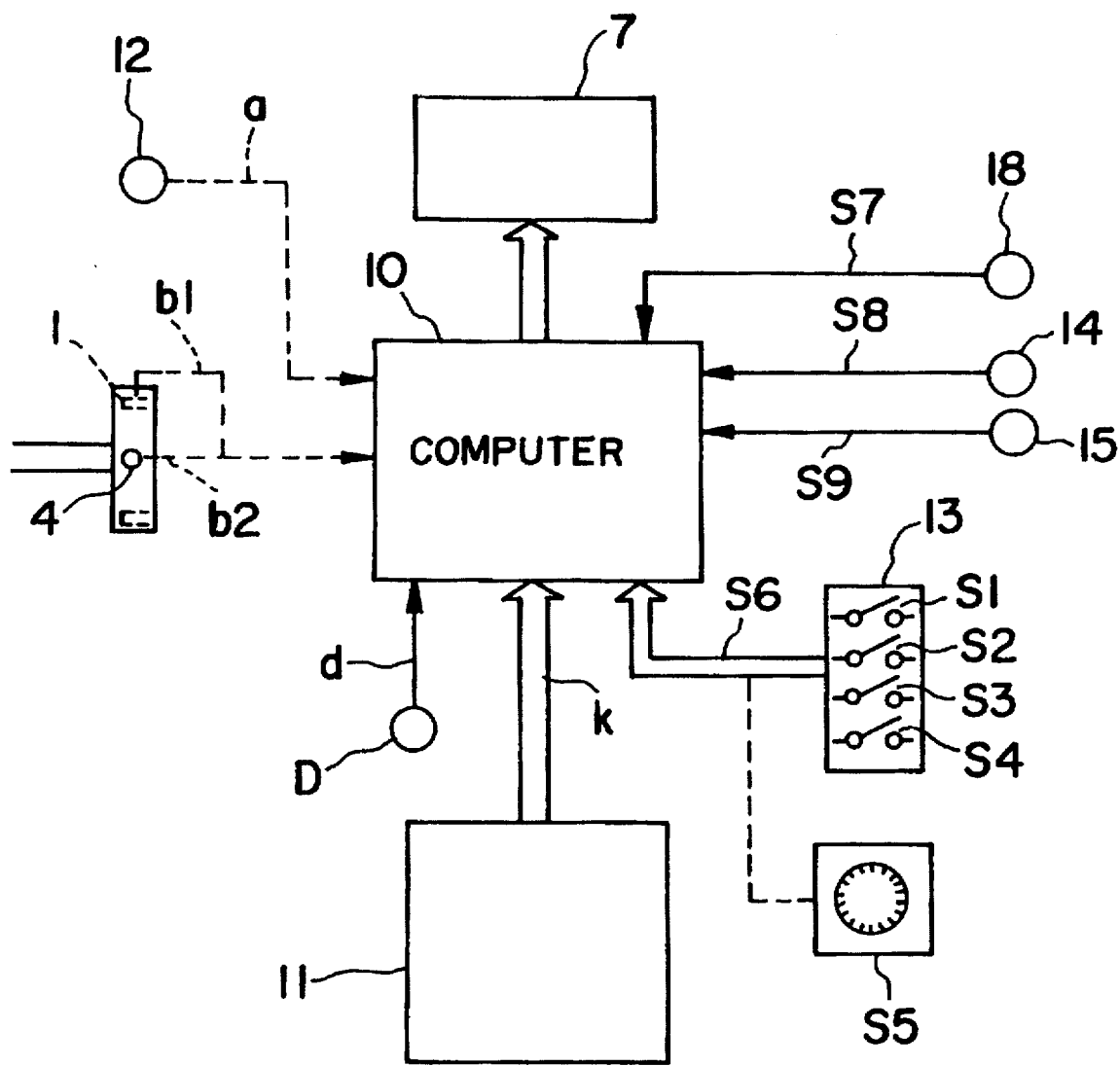
FIG. 5 is a block diagram illustrating various components of the preferred embodiment of the present invention; and, FIG. 6 is a flow chart illustrating operations performed by the preferred embodiment of the present invention.

As illustrated in FIG. 5, switching signal "a", a first measured signal "b1", a second measured signal "b2", a plurality of signals S6 to S9, and a keyboard signal "k" are inputted into the processing unit 10. Switching signal "a" is produced by the selecting switch 12. The first measured signal "b1" is produced by a rotational angle (e.g., turning) of the pair of wheels 1 that are attached to the device body 2. The second measured signal "b2" is produced in response to a turning angle (e.g., rotation) of the measuring lever 3 relative to the vertical shaft 4. Binary signal S6 is output in response to a manipulation of the adjusting signal setting switch 13. Arc signal S7 is output in response to a manipulation of the arc signal setting switch 18. Signal S8 is output in response to a manipulation of the coordinate holding switch 14. Signal S9 is output in response to a manipulation of the continuous-discontinuous turning switch 15. Keyboard signal "k" is output in response to a manipulation of at least one key (not illustrated) of the keyboard 11.

The adjusting signal setting switch 13 produces the binary signal S6, represented by a plurality of ON (HIGH) or OFF (LOW) states, in response to a setting of, for example, four associated switches S1, S2, S3, and S4. In the preferred embodiment, the four associated switches generate a 4-bit signal. Alternatively, the adjusting signal setting switch 13 may be replaced by a rotating switch S5 (see FIG. 5), having sixteen code generating pins for generating the binary signal S6. It is noted that alternative schemes may be employed to generate the binary signal S6 without departing from the spirit and/or scope of the instant invention.

In the preferred embodiment, the coordinate holding switch 14 projects upward from the far end of the measuring lever 3 to a height that is comfortable for a forefinger of a user to engage when a hand of the user grips the tracer 6. However, it is understood that the coordinate holding switch 14 can be positioned in other locations without departing from the spirit and/or scope of the present invention.

The coordinate holding switch 14 of the preferred embodiment is surrounded by a turnable (rotatable) cylinder (illustrated in FIGS. 2–4), having a crescent-shaped fixing part 16 located proximate a top of and surrounding the coordinate holding switch 14. In the preferred embodiment, the coordinate holding switch 14 has a movable part (e.g., key top) 17 that can be depressed to change a state of the coordinate holding switch 14.

The coordinate holding switch 14 generates the signal S8 when the key top 17 is depressed. According to the present invention, the coordinate holding switch 14 is depressed at measuring points in a discontinuous mode of operation. In the preferred embodiment of the present invention, the arc signal setting switch 18 generates the arc signal S7 when the arc signal setting switch 18 is depressed. Actuation of the arc signal setting switch 18 produces the arc signal S7, which converts coordinates of points of the arc figure in the discontinuous mode of operation.

The operation of the measuring device of the present invention will not be described with reference to the flow chart illustrated in FIG. 6.

At step P0, the locking means 9 is disengaged and the measuring lever 3 is moved from the reference position. This causes the state of the start switch D to change to an ON state, activating the processing unit 10. The start switch D generates the signal "d", resetting a previously measured value to an initial value of zero.

Thereafter, step P1 is executed to initiate a measurement operation. Step P2 causes all previously obtained values to be reset to zero. That is, a register of the processing unit 10 is cleared. The measuring device is moved to trace a figure, until the main tracer 6 comes to a point to be measured before the coordinate holding switch 14 is depressed. At this point (time), the coordinate holding switch 14 is depressed (step P3) to produce the signal S8. The arc signal S8, representing the coordinates of a measured point obtained with the main tracer 6, is inputted into the processing unit 10, which performs appropriate calculations based upon a first predetermined arithmetic equation.

The selecting switch 12 is then manipulated (step P4) to select the auxiliary tracer 6a. Accordingly, coordinate points are obtained using the auxiliary tracer 6a. The auxiliary mode indicator LED 12a is turned ON (step P5), to indicate that the auxiliary tracer 6a is active (e.g., selected to obtain coordinate points of the figure). Accordingly, a measurement (obtaining of coordinate points) of the figure using a second predetermined arithmetic equation, that differs from the first predetermined equation, is obtained using the auxiliary tracer 6a (step P6).

In step P7, the selecting switch 12 is manipulated again to reset the measuring device to employ the main tracer 6. Thereafter, step P8 is executed to turn OFF the auxiliary mode indicator LED 12a.

As described above, the preferred embodiment of the present invention is configured so that the device body 2 reciprocally moves in one direction by the rotation of the pair of wheels 1 as the measuring device traces a figure to be measured. The measuring lever 3 is rotatably connected to the device body 2 via the vertical shaft 4. The measuring lever 3 has the main tracer 6 attached proximate the far end thereof, while the auxiliary arm 3a, also located proximate the far end of the measuring lever, extends perpendicularly and laterally from the measuring lever 3 and includes the auxiliary tracer 6a.

Accordingly, the measuring device of the present invention enables the obtaining of coordinate measurements (e.g., coordinate points of a traced figure) by selectively using the auxiliary tracer 6a instead of the main tracer 6, by manipulating the selecting switch 12, when the main tracer 6 (measuring lever 3) is beyond its rotatable (rotatable) range. Thus, the measuring range of the measuring device of the present invention is increased without having to increase the over-all length of the measuring device. Further, because the over-all length of the measuring lever is not increased, the present invention eliminates the need to make large changes in the angle resolution of the measuring device.

What is claimed is:

1. A device for measuring a figure, comprising:
    a device body;
    a pair of rotatable wheels attached to said device body that enables said device to trace a path defining the figure;
    a measuring lever, a near end of said measuring lever being pivotally connected to said device body;
    a main tracer that is positioned proximate a far end of said measuring lever to obtain coordinate points of the figure;
    an auxiliary arm that laterally extends from said measuring lever proximate said far end of said measuring lever; and
    an auxiliary tracer that is associated with said auxiliary arm for obtaining coordinate points of the figure.

2. The measuring device of claim 1, further comprising a selecting switch that selects one of said main tracer and said auxiliary tracer.

3. The measuring device of claim 2, further comprising an indicator that indicates which of said main tracer and said auxiliary tracer is selected by said selecting switch.

4. The measuring device of claim 1, wherein said auxiliary arm extends perpendicularly from said measuring lever.

5. The measuring device of claim 1, further comprising:
    a processing unit that performs calculations in accordance with a predetermined equation using said obtained coordinate points.

6. The measuring device of claim 2, further comprising:
    a processing unit that performs calculations in accordance with a predetermined equation using said obtained coordinate points.

7. The measuring device of claim 6, wherein said processing unit performs calculations in accordance with employs a first predetermined equation when said selecting switch selects said main tracer, said processing unit performing calculations in accordance with a second predetermined equation when said selecting means selects said auxiliary tracer.

8. An apparatus for tracing a figure, comprising:
    a main tracer that traces the figure and produces a signal related to coordinate points of said traced figure;
    an auxiliary tracer that traces the figure and produces a signal related to coordinate points of said traced figure;
    means for driving said main tracer and said auxiliary tracer to trace the figure;
    means for selecting one of said main tracer and said auxiliary tracer; and
    a processor that performs calculations in accordance with a predetermined equation using said obtained coordinate points.

9. The apparatus of claim 8, further comprising means for indicating whether said main tracer or said auxiliary is selected by said selecting means.

10. The apparatus of claim 9, wherein said indicating means provides a visual indication.

11. The apparatus of claim 8, wherein said processor performs calculations in accordance with a first predetermined equation when said main tracer is selected by said selecting means, said processor performing calculations in accordance with a second predetermined equation when said auxiliary tracer is selected by said selecting means.

12. The apparatus of claim 8, further comprising means for inputting coordinated points traced by one of said main tracer and said auxiliary tracer.

13. The apparatus of claim 8, further comprising means for enabling and disabling said processor.

14. The apparatus of claim 8, wherein said auxiliary tracer is offset from said main tracer.

15. An apparatus for tracing a figure, comprising:

a main body;

a main tracer positioned a first predetermined distance from said main body, said main tracer obtaining coordinate points of the figure being traced;

an auxiliary tracer positioned a second predetermined distance from said main body, said auxiliary tracer obtaining coordinate points of the figure being traced, said auxiliary tracer being offset from said main tracer;

a driving mechanism that propels said tracing apparatus to trace a path;

a processor that receives data from one of said main tracer and said auxiliary tracer at a predetermined time, said processor performing calculations based upon said received data; and a selector that selects which of said main tracer and said auxiliary tracer provides said data to be received by said processor at said predetermined time.

16. The apparatus of claim 15, further comprising means for forwarding said data to said processor at said predetermined time.

17. The apparatus of claim 15, further comprising:

a first arithmetic calculation that is performed in accordance with said processor when said selector selects said main tracer; and a second arithmetic calculation that is performed in accordance with said processor when said selector selects said auxiliary tracer.

18. The apparatus of claim 15, wherein said auxiliary tracer is perpendicularly positioned relative to said main tracer.

19. The apparatus of claim 18, wherein said auxiliary tracer is perpendicularly positioned relative to said main tracer in a lateral plane.

20. The apparatus of claim 15, further comprising means for indicating which of said main tracer and said auxiliary tracer is selected by said selector.

* * * * *